United States Patent
Glushko et al.

[11] 3,889,524
[45] June 17, 1975

[54] ARRANGEMENT FOR CHECKING STABILITY OF SELF-SUPPORTED OBJECTS

[76] Inventors: Mikhail Fedorovich Glushko, prospekt Shevchenko, 15/5, kv. 17; Mikhail Pavlovich Nikitinsky, ulitsa Perekopskoi Divizii, 14a, kv. 48; Ilya Fedorovich Pakhomov, ulitsa Lenina, 44/46, kv. 55; Oleg Fedorovich Kurgansky, prospekt Shevchenko, 10, kv. 30, all of Odessa, U.S.S.R.

[22] Filed: Feb. 1, 1974

[21] Appl. No.: 438,777

[52] U.S. Cl. .................. 73/65; 73/133 R; 235/61 A
[51] Int. Cl. ........................................... G01m 1/00
[58] Field of Search .......... 73/65, 133 R; 235/61 R, 235/61 A

[56] References Cited
UNITED STATES PATENTS

| | | | |
|---|---|---|---|
| 2,179,822 | 11/1939 | Imm | 73/65 X |
| 2,470,069 | 5/1949 | Davies | 73/65 |
| 3,003,254 | 10/1961 | Pattison | 73/65 X |

*Primary Examiner*—Charles A. Ruehl
*Attorney, Agent, or Firm*—Holman & Stern

[57] ABSTRACT

An arrangement checks the position of the resultant force of support reactions of an object within its support contour. Since the position of the resultant force of the support reactions of a crane completely determines the state of its stability against tilting, the arrangement according to the invention performs continuous and automatic control of crane stability. The arrangement comprises a sensor of the value of the support reactions of the object being checked, and a frame mounting guide members. The lines interconnecting the points of location of the guide members form a master contour which is geometrically similar to the support contour of the object. Pull elements extend inside the master contour through the guide members, and these pull elements are interconnected to form a common junction. Transducers connected to the support sensors transmit to the pull elements forces, proportional to the value of the support reaction multiplied by the length of the pull element inside the master contour. By this arrangement, the junction of the pull elements takes the position inside the master contour which coincides with the position of the resultant force of the support reactions of the objects. Where there are only weight loads in play, the arrangement checks the position of the center of gravity of an object or a group of objects. For the purpose of checking the center of gravity the arrangement comprises a platform on which objects are placed. The platform is connected to an indicating instrument which can be located under the platform, while the platform is made of a transparent material.

9 Claims, 16 Drawing Figures

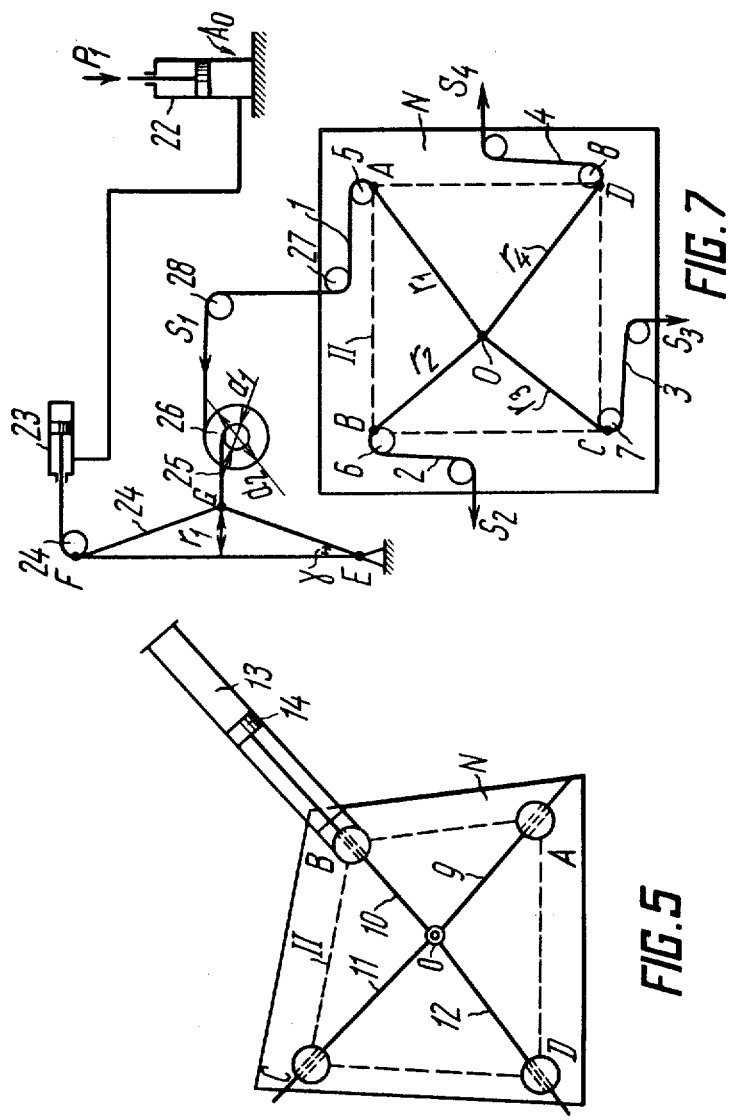

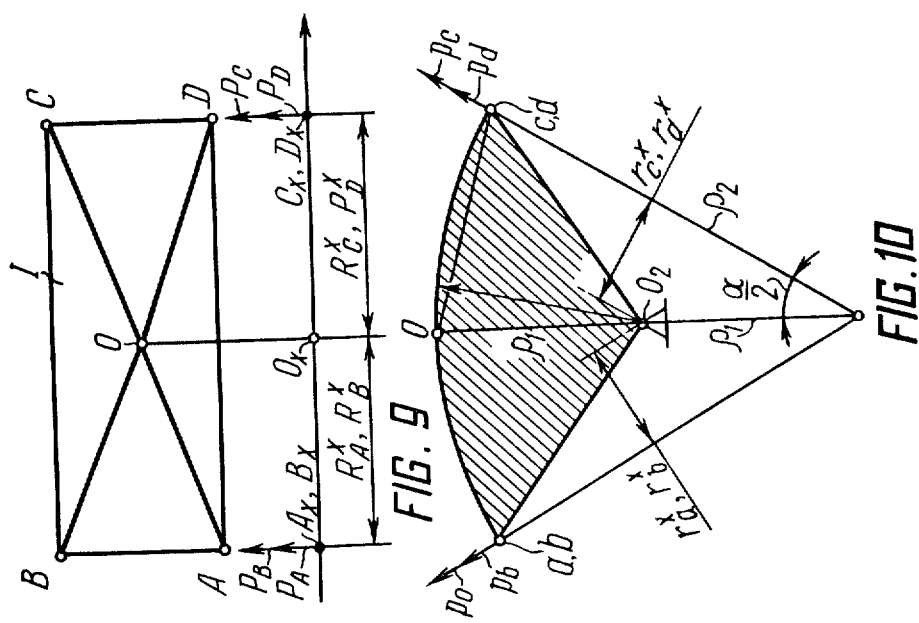
FIG. 9
FIG. 10
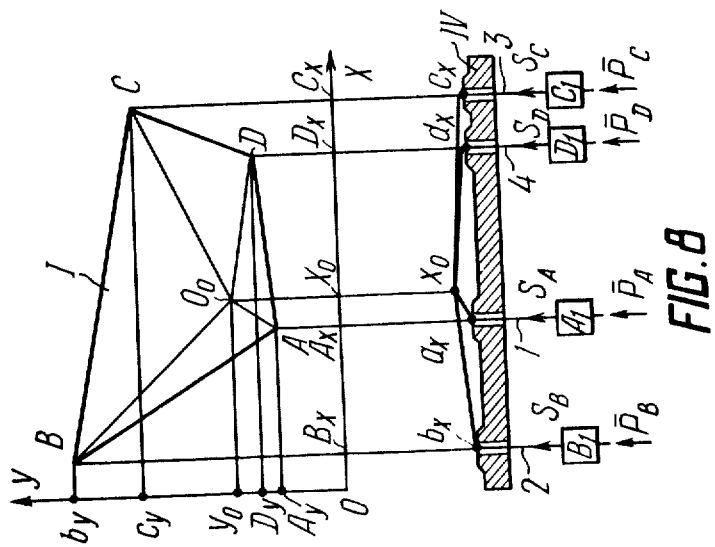
FIG. 8

ARRANGEMENT FOR CHECKING STABILITY OF SELF-SUPPORTED OBJECTS

BACKGROUND OF THE IVENTION

The invention relates to measuring technique, and more particularly to an arrangement for checking stability of self-supported objects.

The invention may be most advantageously used in the boom cranes.

The main problem in the improvement of the technical performance of self-supported cranes, that is of their lifting capacity and efficiency, is to ensure the check and maintenance of their stability, as well as protection against overload. Various arrangements being used for that purpose are referred to as lifting capacity limiters or load moment limiters.

Known lifting capacity limiters or load moment limiters for self-supported boom cranes may be divided into two groups.

The first group includes all types of limiters checking the weight of the load being lifted by measuring forces either in the steel rope or in members of the steel structure of the crane. In this case the value of a force or of a signal, which is proportional to the force, is subject to correction which depends on the boom being checked. Most widely used is a limiter checking both the weight of the load being lifted and the boom angle so as to measure the value of the load moment created by the load weight about the tilting line of the crane. Known in the art is an arrangement operating on the basis of the signals of the load weight and boom angle with the conversion of these signals so as to obtain a single resultant signal.

In such arrangements use is made of signals from the load weight sensors incorporated either in the rope or in the steel structure of the boom, and from the boom angle sensors which are normally located at the boom base.

These signals are fed into a converter unit which produces a single signal corresponding to the value of the load moment. The number of such units depends on the number of the load-lifting characteristics of the crane. Switching over from one unit to another upon a change in the load-lifting characteristic is effected manually.

The arrangements of the above-described type have the following disadvantages:

1. Complicated structure due to:
  a. necessity of measuring two different values — load weight and boom angle;
  b. employment of devices for matching and conversion of the two signals defining different parameters into single signal; and
  c. employment of a large number of correction devices ensuring the transition of the crane from operation with one load-lifting characteristic determining the operating conditions of the crane to another such characteristic.
2. Insufficient reliability of the structure due to:
  a. possibility of failure of the arrangement;
  b. possibility of errors by the operator in switching over from one load-lifting characteristic to another and;
  c. possibility of mechanical damage to the elements of the stability check system.
3. Insufficient accuracy of operation due to:
  a. friction losses in the structural members; and
  b. losses in transmission and conversion systems handling the signals from the force and boom angle sensors.
4. Incomplete check of the crane stability due to the fact that the arrangement does not enable the check of:
  a. wind loads applied to the crane;
  b. inertial loads appearing during the period of unsteady motion conditions of the mechanisms;
  c. inclination of a land surface over which the crane moves; and
  d. deformation of the crane supports and of the land surface over which it moves.
5. Excessive stability margins in the directions other than the transverse axis of the crane due to the fact that the arrangements of the above-described type ensure the check of the value of the load moment as defined for the most dangerous position of the crane boom (transversally with respect to the longitudinal axis), rather than the check of the stability margin.

The second group includes the load moment limiters checking one parameter only — the forces in members of the steel structure of the crane, such as in the gantry rear support, the rotatable support, the members of the fixed frame, and the undercarriage.

These arrangements check the crane stability by the value of the load moment so that they can operate without a correction based on several load-lifting characteristics.

In such arrangements, a signal is fed from a sensor incorporated in the steel structure of the crane into a comparison unit, and the value of this signal is compared to the reference signal corresponding to the minimum crane stability margin. When the sensor signal is equal to the reference signal, an interlock system will be actuated to deenergize the mechanisms of the crane.

The arrangements of the above-described type have the following disadvantages:

1. Crane stability is checked only in the direction of the load moment application, and a check in other directions is not possible.
2. There is no opportunity of continuous visual tracking of the stability conditions.
3. Wind and dynamic loads are taken into account only in the direction of the load moment application.

In addition, the limiters of both first and second groups do not reveal the instant where the moment becomes close to the critical value corresponding to the loss of stability of the crane.

The stability of an object largely depends on the position of its center of gravity inside the support contour of the object. This center of gravity is determined and checked through all stages of the development of the crane — design, manufacture, tests and so on.

Known in the art are arrangements for finding the center of gravity of objects or a group of objects. Thus, known in the art is a platform which can be tilted with respect to the horizon by means of hydraulic jacks. The platform is tilted until the object placed thereon is in the state of unstable equilibrium which corresponds to a position at which the line of action of the resultant force of the gravity forces of the object extends through the tilting line. After the tilting of the platform in different directions, the lines of action of the resultant force of the gravity forces of the object intersect each others at one point, thereby defining the center of gravity of the object.

Other arrangements for finding the center of gravity of an object comprise a platform supported at three points by transducers measuring the values of support reactions. Based upon the dimensions of the platform and the values of support reactions, the position of the center of gravity may be found by calculations.

Known in the art is also an arrangement comprising a platform suspended on fixed axles so that upon placing an object on the platform the latter is deviated from the initial position. The weight moments of the object being tested are evaluated on the basis of the amount of deviation of the platform or by the weight of the load which brings the platform into the initial position. Then the position of the center of gravity of the object is found by calculations based upon the value of the load moments and the weight of the object.

The disadvantages of these arrangements are the following:

a. the arrangement cannot directly determine the position of the center of gravity of an object or a group of objects, but rather determines either the value of support reactions, or the value of load moments;

b. in order to determine the position of the center of gravity, its position relative to a horizontal plane should be measured, which is not always possible, and in some cases this requires additional operations of mounting, fixing of the object and the like;

c. in order to ensure automatic checking of the center of gravity of objects, computer systems are to be used, as well as a system providing for transmission and matching of signals and data output, whereby such arrangements become complicated and expensive; and d. these arrangements do not enable visual determination of the center of gravity of an object so as to continuously trace all displacements thereof.

SUMMARY OF THE INVENTION

It is an object, of the present invention to provide an arrangement for checking stability of a self-supported object which arrangement enables the determination of actual stability conditions of a crane.

Another object of the invention is to provide an arrangement for checking stability of a self-supported object in which the stability conditions are determined at once for all tilting lines thereof, rather than for a single tilting line only.

Still another object of the invention is to provide an arrangement for checking stability of a self-supported object which is simple, convenient and reliable in operation.

A further object of the invention is to provide an arrangement for checking stability of a self-supported object which enables the determination of the object stability with maximum accuracy.

Another object of the invention is to provide an arrangement for checking stability of a self-supported object which enables continuous visual evaluation of the stability conditions of the object.

Still another object of the invention is to provide an arrangement for checking stability of a self-supported object which not only enables the check of the object stability, but also permits to check the strength thereof.

Furthermore, an object of the invention is to provide an arrangement for checking stability of a self-supported object which enables continuous visual determination of the position of the center of gravity of the object.

These and other objects are accomplished due to the fact that in an arrangement for checking stability of a self-supported object comprising sensors of normal support reactions of the object. According to the invention there are provided guide members mounted at the vertexes of a master contour, which is geometrically similar to a support contour of the object defined by the lines interconnecting its support points, and pull elements extending through the guide members. One end of each pull element is connected to the others inside the master contour so as to form a freely displaceble junction, and each sensor is connected to a transducer which receives the signals of the sensor and transmits to the other end of each pull element a moment which is directly proportional to a corresponding support reaction and to the length of the pull element inside the master contour. In this manner the junction interconnecting the pull elements takes a position inside the master contour which coincides with the position of the point of application of the resultant force of the normal support reactions of the object.

The arrangemet for checking stability according to the invention is primarily intended for assuring safety during the operation. However, besides this, the arrangement also provides for substantial economical advantage due to reduced cost of the arrangement which is made using the simplest technical means and which enables actually efficient check of stability of an object by checking the position of the resultant forces of support reactions inside the support contour of the object. The arrangement according to the invention ensures improved accuracy of the evaluation of the stability conditions due to the fact that not only the main loads applied to the object (weight of the object) are taken into account, but also the additional load factors (inertial forces of the masses of the object, wind loads and the like). The arrangement is convenient in operation since the operator can visually observe, at any instant of the operation of a crane, the stability conditions of the crane and discover a dangerous situation long before the occurance of tilting moment. Since the arrangement does not require additional adjustment when changing from one operation mode for another (change in the load-lifting characteristic), its operation becomes more convenient.

The arrangement according to the invention may be made in such a manner that the operator could not interfere with its operation so as to enable the objective evaluation of the object stability at every instant of its operation.

Since the basic data for operation of the arrangement are the values of support reactions of the object, the arrangement can check not only the stability conditions, but also the strength of the object.

Furthermore, it should be noted that the invention makes it possible to increase the load moment of a crane (that is its lifting capacity) due to the opportunity of operation with minimum stability margin with respect to all tilting lines of the crane.

The arrangement enables the installation of the crane on outriggers so as to obtain the most favourable distribution of the support pressure by checking the position of the resultant force of support reactions during the positioning of the outriggers.

The guide members preferably comprise pulleys journalled on axles, while the pull elements comprise flexible threads reeved in said pulleys.

Each transducer preferably comprises two pivotally interconnected pull elements having free ends pivotally secured at fixed points, with at least one of the pull elements being connected to a support sensor which transmits a force to this pull element, and the junction interconnecting the pull elements being connected to a pull element of the master contour which deviates the transducer pull element in the transverse direction with respect to the initial straight position of the pull elements by the amount proportional to the length of the pull element inside the master contour. In this manner, there is transmitted to the pull element of the master contour a moment which is directly proportional to the support reaction and to the length of the pull element inside the master contour.

This embodiment of the transducer enables the simplest conversion of the value of the support reaction into the force which is proportional to the support reaction and to the length of the pull element inside the master contour.

In accordance with one embodiment of the invention, the arrangement may be provided with guide members mounted at the vertexes of the projections of the support contour vertexes on one of the selected coordinate axes, whereby the junction interconnecting the pull elements takes a position which coincides with the position of the point of the projection of the resultant force of support reactions of the object on the selected coordinate axis.

This embodiment of the arrangement enables the check of the position of the resultant force of support reactions in coordinate axes so that linear data are transmitted to an interlock system or to secondary tracing means by using electric, hydraulic or like circuits.

The pull elements may comprise a sector having a large radius of curvature loosely mounted on a fixed axle, and the transducers may comprise rods of a length variable under the action of a force proportional to a support reaction. Each rod is pivotally mounted with one end on a common axle or axis with the others, while the other ends of the rods are pivotally connected to the points of the sector arc corresponding to the positions of the projections of the vertexes of the support contour of the object on the selected coordinate axis. In this manner the point of the sector arc corresponding to the position of the projection of the resultant force of support reactions on the same coordinate axis will be displaced, under the action of forces in the rods, by the same amount as the projection of the resultant force.

This embodiment of the arrangement, which has no flexible pull elements and pulleys, as well as the substantial reduction of the number of movable members, permits elimination of losses associated with the bending stiffness of the members, as well as the losses due to the elastic elongation thereof, and to reduce friction in joints, whereby the accuracy of the arrangement is improved.

In accordance with another embodiment of the invention, the arrangement may be provided with a platform for placing objects thereon, with the master contour being geometrically similar to the support contour of the platform.

The arrangement having the platform enables the definition of the position of the center of gravity of an object or of several objects placed on the platform.

In this case, the definition of the center of gravity is effected continuously, while its coordinates may be automatically transmitted to the information and control system.

The arrangement according to the invention may be used through all stages of the development of a crane:
a. at the design stage it is useful for selection of the layout of the equipment, assemblies and the like; the components of the crane may be simulated as masses of required weight which are placed on the platform in accordance with the selected layout pattern;
b. at the test stage for determination of the actual center of gravity of the crane and;
c. during the operation to ensure a predetermined loading of the crane.

In order to eliminate the influence of the platform weight on the readings of the arrangement, the platform is connected by its support points to means counterbalancing its own weight.

This embodiment of the platform improves the accuracy of the arrangement.

It is highly advantageous that the master contour be placed under the platform, and its dimensions should be equal to those of the support contour of the platform, which is made of a transparent material and graduated in units defining the coordinates of the center of gravity of the object with respect to preselected coordinate axes.

This embodiment enables visual determination of the center of gravity of the object directly upon placing it on the platform.

In accordance with another embodiment of the invention, the arrangement may be provided with an indicating instrument disposed under the transparent platform. The instrument comprises two piston couples interconnected by a rod and associated with the junction interconnecting the pull elements of the master contour, and the chambers of the cylinders of the piston couples are connected by means of a transparent pointer tube filled with liquid and having an extraneous point-like liquid inclusion which has a colour different from that of the liquid. The piston couples are fixed, together with the transparent pointer tube, in a holder freely rotatable about a vertical axis, and the dimensions of all the components of the indicating instrument are selected in such a manner that the position of the extraneous point-like liquid inclusion in the pointer tube corresponds, in a certain scale, to the position of the pull elements junction inside the master contour.

Due to the location of the indicating instrument outside the zone of action of the operating loads of the arrangement, this embodiment enables the reduction of the friction losses in the joints, as well as of the elastic deformation, whereby the accuracy is improved.

BRIEF DESCRIPTION OF THE DRAWINGS

The invention will now be described in greater details with reference to specific embodiments thereof illustrated in the accompanying drawings, in which:

FIG. 5 shows the master contour with rigid pull elements;

FIG. 7 shows the arrangement according to the invention having flexible pull elements and a transducer;

FIG. 8 is an embodiment of the arrangement according to the invention, wherein the coordinates of the resultant force are determined in coordinate axis;

FIG. 9 shows the support contour of an object;

FIG. 10 shows a calculation diagram for the embodiment of the arrangement having rigid pull elements and a sector;

DESCRIPTION OF THE PREFERRED EMBODIMENTS

A self-supported object $N_o$ (shown in a plan view in FIG. 1) placed on its own supports $A_o, B_o, C_o, D_o$ has sensors (not shown in the Figure) for sensing support reactions $P_1, P_2, P_3, P_4$. Segments $A_oB_o, B_oC_o, C_oD_o, D_oA_o$ interconnecting the support points $A_o, B_o, C_o, D_o$ define an actual closed contour I of the object $N_o$. The support reactions $P_1, P_2, P_3, P_4$ are sensed by the sensors incorporated in the supports which transmit forces to a transducer (not shown in the Figure) of an arrangement for checking stability.

Figure 2:
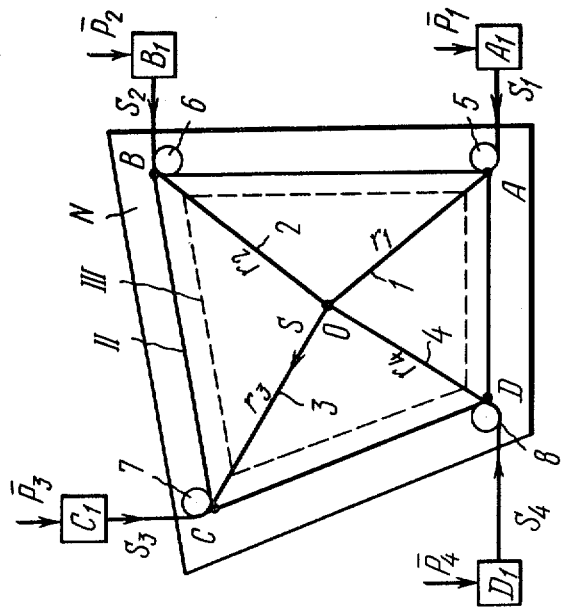
FIG. 2 is a general view of the master contour illustrating a structural diagram of the pull elements drive.
Figure 1:
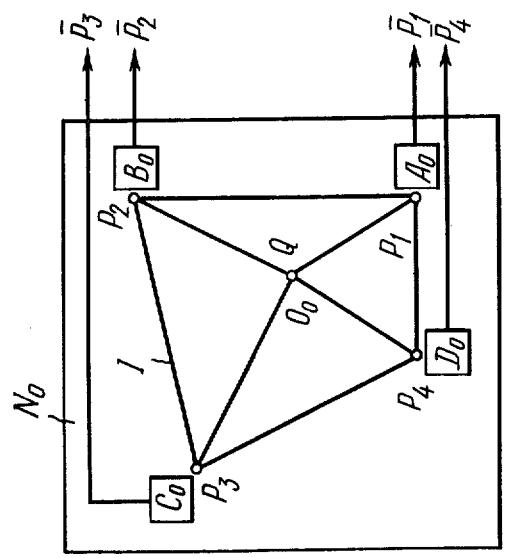
FIG. 1 shows a diagrammatic view of the actual support contour of a self-supported object.

An arrangement for checking stability (FIG. 2) is disposed on a rigid frame N having a polygonal master contour II which is geometrically similar to the actual support contour I of the self-supported object $N_o$ (FIG. 1). The vertexes A,B,C,D of the master contour II correspond to the vertexes $A_o, B_o, C_o, D_o$ of the actual support contour I. Flexible pull elements 1,2,3,4 extend from the points A,B,C,D through guide pulleys 5,6,7,8. All the pull elements 1,2,3,4 are interconnected in a point O inside the master contour II so as to form a single freely displaceable junction. The guide pulleys 5,6,7,8 are mounted on the frame N in such a manner that the points A,B,C,D are located substantially at the vertexes of the polygonal master contour II, that is geometrically similar to the actual support contour I of the object. In order to reduce distorsions, the guide pulleys are selected to have the smallest size possible, which is limited by the dimensions of the pull elements and the diameters of the pulleys.

Free ends of the pull elements 1,2,3,4 are connected to transducers $A_1, B_1, C_1, D_1$ which translate the tension of the pull elements into forces which are directly proportional to the value of the corresponding support reactions $P_1, P_1, P_3, P_4$ multiplied by the length of the pull elements inside the master contour.

The pull elements may be made rigid (FIG. 5). In this case, mounted on the rigid frame N are support joints A,B,C,D having pivot axes coniciding with the vertexes of the master contour II. Rigid pull elements 9,10,11,12 extend through guide members in the joints so that their axes extend through the pivot axes of the joints, and the pull elements are interconnected so as to form a single common freely displaceable junction O. As an example, there is shown at the support joint B a mechanism for driving the pull elements, and which comprises a hydraulic jack 13 provided with a piston 14 whose piston rod comprises a pull element 10.

The transducers A,B,C,D (FIG. 2) for driving the pull elements 1,2,3,4 may comprise any known automatic control elements which enable the performance of the above-described functions.

Figure 6:
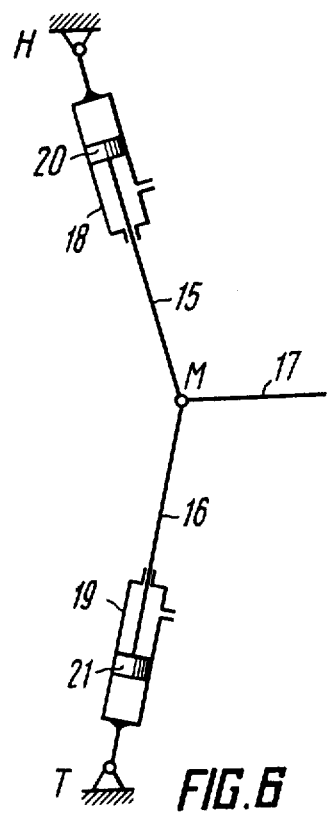
FIG. 6 shows a transducer with rigid pull elements.

As an example, FIG. 6 shows a diagrammatic view of the transducer for driving one of the pull rods.

Pull elements 15 and 16 are pivotally interconnected in a junction M. A transversel pull element 17 is connected to the junction M interconnecting the pull elements 15 and 16, with the pull element 17 being connected to the pull element of the master contour I. A hydraulic jack 18,19 provided with a piston 20,21 is incorporated in each of the pull elements 15 and 16. The jack generates forces in the pull elements 15 and 16 under the action of a pressure proportional to the support reaction.

Other ends of the pull elements are pivotally secured at fixed points T and H.

FIG. 7 shows a diagrammatic view of an arrangement for checking stability of a crane, wherein the reaction $P_o$ of the support $A_o$ is sensed by a sensor comprising a hydraulic cylinder 22 whose working chamber is connected by means of a conduit to a piston couple 23. The force generated by the fluid pressure in the piston couple 23 is transmitted to a transducer. The transducer comprises a flexible pull element in the form a thread 24 having one end fixed at a point E, with the other end of the thread being reeved in a pulley 24' and connected to the piston rod of the piston couple 23. A pull element 25 is connected to the midpoint of the thread 24 and is associated, via an amplifier 26 comprising two pulleys $d_1$ and $d_2$ of different diameters mounted on a common axle, with a pull element 11 of the master contour II by means of guide pulleys 5,27,28. Similar transducers and support sensors (not shown in the Figure) are connected to the remaining pull elements 2,3,4 of the master contour II.

The length of the pull element 1 and of the transverse pull elements 25 is selected such that with the junction O interconnecting the pull elements, being positioned inside the master contour at the point A, so that the length $r_1 = OA$ of the pull element is equal to zero, the flexible pull element 24 takes a position between the points E and F.

The pulleys $d_1$ and $d_2$ of the amplifier 26 are rigidly interconnected and are rotatable about a common axis. With this embodiment, the deviation $\bar{r}_1$ of the pull element 24 under the action of the transversal pull element 25 is proportional to the displacement $r_1 = OA$ of the pull rod 1 of the master contour, that is;

$$r_1 = d_1/d_2 \, r_1$$

The initial length $l$ of the pull element 24 of the transducer 26 is $l=EF$, and the ratio between the diameters of the pulleys $d_1/d_2$ of the displacement amplifier is selected such that the angle of deviation of these pull elements should always be so small that the sine of this angle would be equal to its tangent with sufficient accuracy; that is:

$$\sin \gamma = tg\ \gamma = 2\ F_1/l$$

FIG. 8 shows the arrangement which enables the determination of the projection of the resultant force of support reactions on one of the selected coordinate axes. The actual support contour of the object is projected, in a certain scale, on coordinate axis x and y. The contour itself is provided with sensors at the support points A,B,C,D (not shown in the Figure) sensing normal support reactions $P_A, P_B, P_C, P_D$ of the object.

One of the projections of the contour, e.g., that on the OX axis, is transferred to a rigid bar IV with points $a_x, b_x, c_x$ and $d_x$ which coincide with the vertexes of the support contour. Guide members for the pull elements 1,2,3,4 are mounted at the points $a_x, b_x, c_x, d_x$, the pull elements having their ends interconnected on the surface of the bar IV so as to form a freely displaceable junction $x_o$. Free ends of the pull elements 1,2,3,4 are connected to the transducers $A_1, B_1, C_1, D_1$ which, in their turn, are connected to the sensors of support reactions.

Figures 11, 12:
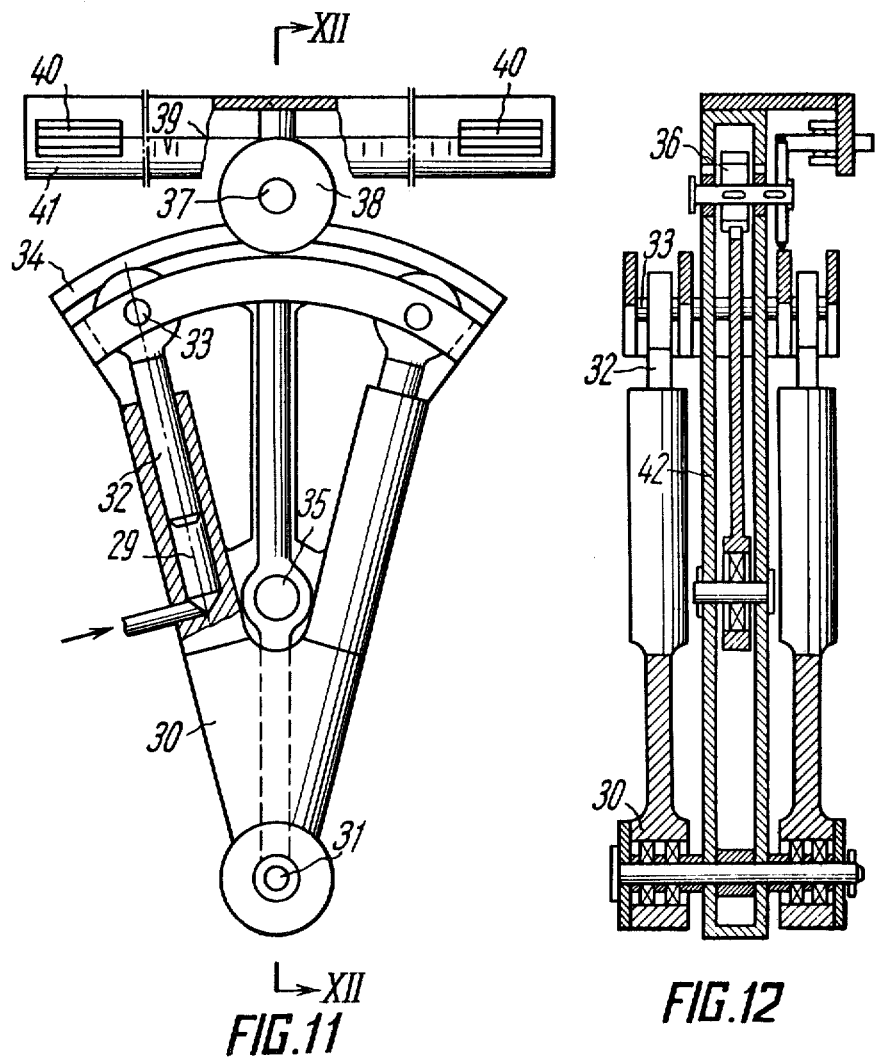
FIG. 11 shows a front elevation of an embodiment of the arrangement having rigid pull elements and the sector.
FIG. 12 is a view taken along the line XII—XII in FIG. 11.

The most preferable embodiment of the arrangement which enables the determination of the projection of the resultant force of support reactions on one of the selected coordinate axes is shown in FIGS. 11 and 12, and the calculation diagram of the arrangement is shown in FIGS. 9 and 10.

The arrangement comprises four piston couples 29 incorporated in rods 30, one end of each rod being pivotally secured to a fixed axle 31. The other ends of the rods, which are connected to the rod 32, are mounted by pairs on the axle 33 of a sector 34 having a large radius of curvature. The sector 34 is disposed between the rods 30 and is loosely mounted on a fixed axle 35. A gear 36 meshes with the toothed sector 34 and transmits the motion, via a shaft 37 and a pulley 38, to a thread 39 engaged in a pulley 40. A pointer (not shown in the Figure) is secured to the thread 39 to indicate on a scale 41 the position of the projection of the resultant force of support reactions on one of the coordinate axes. The axles 31,29, and 37, as well as the scale 41, are mounted on a common holder 42.

Figure 13:
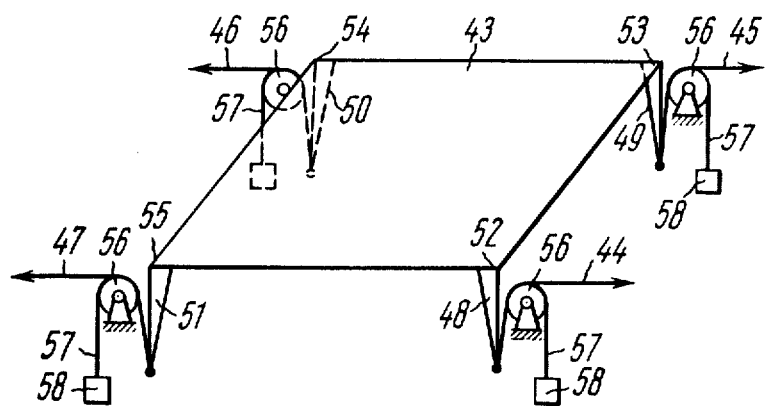
FIG. 13 shows a general view of the platform.
Figure 14:
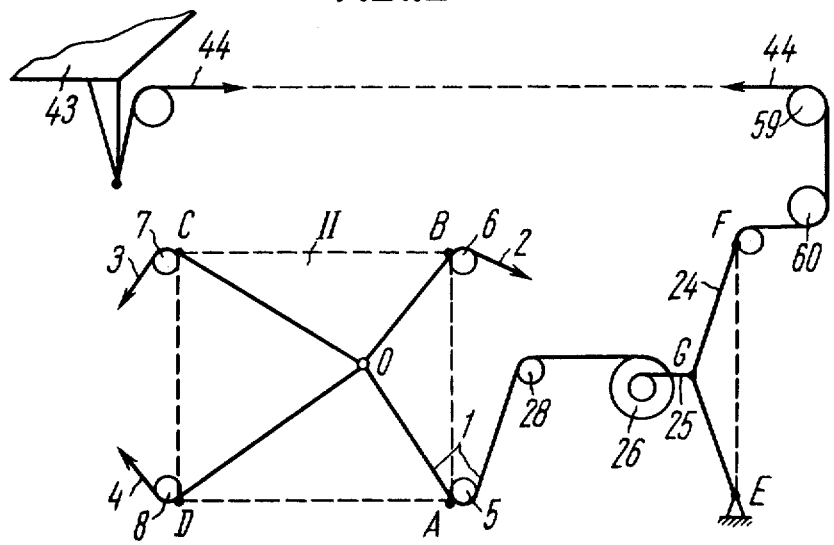
FIG. 14 shows a general view of an arrangement for determining of the position of the center of gravity of objects.

Since the arrangement for checking stability of objects determines the position of the resultant force of support reactions of the object, in the case where only the weight of the object is in play, the arrangement will show the position of the center of gravity of the object. For that purpose the arrangement can be made in the form of an instrument which enables the determination of the center of gravity of an object or a group of objects, or models thereof, so that it could be used in the design practice, in testing a new machine, as well as during the operation of the machine. This arrangement, which is shown in FIGS. 13, 14 and is made as follows.

A rectangular platform 43 (FIG. 13) is suspended on pull elements 44,45,46,47 by means of holders 48,49,50,51 mounted in platform 43 at vertexes 52,53,54,56 of the support contour of the platform 43.

The pull elements 44,45,46,47 are reeved in pulleys 56. Weights 58 counterbalancing the weight of the platform 43 are suspended from the holders 48,49,50,51 through the pulleys 56 by means of additional flexible pull elements 57.

Other methods of fixing the weights counterbalancing the weight of the platform may be used.

The connection of the pull elements 44,45,46,47 to the transducer is shown for the pull element 44 (FIG. 14). The pull element 44 is reeved in a system of pulleys 59,60 and is connected to the transducer. The latter has a transversal pull element 25 which is connected, by means of deflecting pulleys 28 and guide pulles 5, to the pull element 1 of the master contour II.

The pull elements 1,2,3,4 of the master contour II are interconnected so as to form a single, common freely displaceable junction O, the arrangement being such that the position of the junction at the point A corresponds to the straight shape of the thread 24 of the transducer.

All the remaining pull elements are connected in a similar manner. For convenient operation. The master contour II and the transducers may be located in different places than shown.

The master contour II is geometrically similar to the support contour of the platform 43.

Upon placing weights on the platform 43 (FIG. 13), the junction O interconnecting the pull elements (FIG. 14) takes a position inside the master contour II which corresponds to the position of the center of gravity of the weights placed on the platform 43.

In order to facilitate the operation and to eliminate the re-calculation of the coordinates of the center of gravity of the weights, the master contour II of the arrangement may have dimensions identical to those of the platform and may be placed under the platform. The platform is preferably made of a transparent or translucent material.

Figure 15:
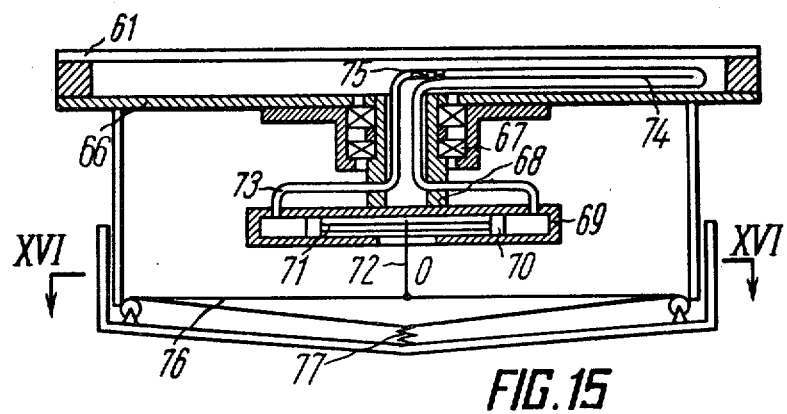
FIG. 15 shows an embodiment of the arrangement having an indicating instrument.
Figure 16:
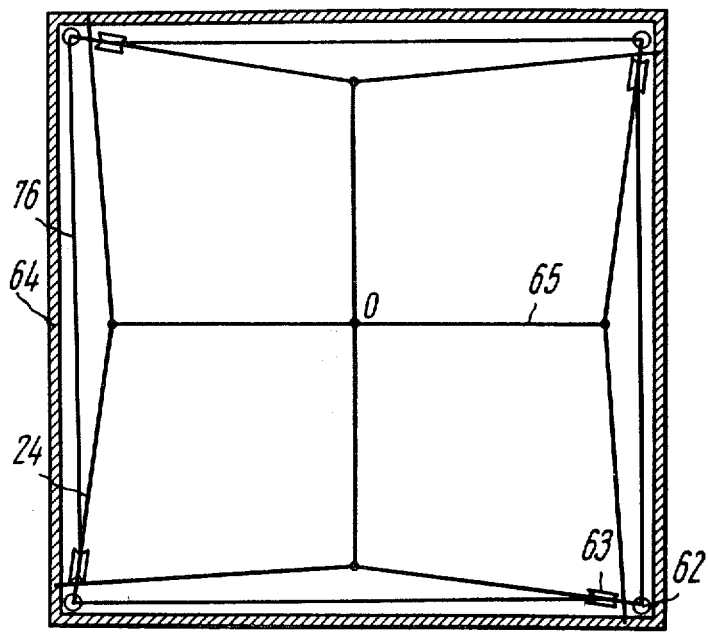
FIG. 16 is a sectional view taken along the line XVI—XVI in FIG. 15.

This embodiment of the arrangement is shown in FIGS. 15 and 16, wherein a platform 61 is suspended by means of supports 62 on four flexible pull elements 24 of a transducer. The elements 24 are reeved in pulleys 63. Other ends of the transducer pull elements are fixed to a housing 64 of the arrangement.

Pull elements 65 are connected at their ends to the midpoints of the pull elements 24 of the transducer, with the other ends of the pull elements 65 being interconnected to form the junction O. Mounted in the center of a base 66 of the platform 61 is a hollow holder 68 journalled in bearings 67. A twin piston 69 having two pistons 70 connected by a piston rod 71 is fixed to the lower end of the holder 68. Mounted on the intermediate portion of the piston rod 71 is a needle 72 connected to the junction O. The two chambers of the cylinder of the piston 69 are placed in communication by flexible hoses 73 extending through the holder 68 and by a transparent pointer tube 74 disposed in the body of the platform 61, which is made of a transparent material.

The pointer tube 74 is rotatable in the bearings 67 together with the holder 68 and the piston couple 69. The chambers of the cylinders of the piston 69, hoses 73 and pointer tube 74 are filled with a homogenous liquid, with a point-like inclusion 75 of extraneous liquid placed in the pointer tube 74. Both pistons 70, together with the piston rod 71 and the needle 72, are freely displaceable in the cylinder of the piston couple 69 so as to expell the liquid from one chamber of the cylinder into another. Accordingly, the extraneous point-like liquid inclusion 75 will be displaced in the pointer tube 74.

In order to eliminate the influence of the weight of the platform 62 on the readings of the instrument, the platform 61 is suspended on strings 76 and springs 77.

The above-described arrangement for checking stability of an object functions as follows.

Signals corresponding to the value of support reactions $P_1, P_2, P_3, P_4$ of a crane (FIGS. 1, 2) are fed from the support sensors to the transducers $A_1, B_1, C_1, D_1$, as indicated by the arrows. In each transducer there is generated a force which is equal to the product of the value of the signal P from the support sensor by the length of the pull element inside the master contour II.

The converted forces are applied, via the pull elements 1,2,3,4, to the junction O to cause it to move to that point of the contour where the forces $S_1, S_2, S_3, S_4$ applied to this junction are in equilibrium. In this case the forces $S_1, S_2, S_3, S_4$ will be the following:

$S_1 = kP_1r_1; \; S_2 = kP_2r_2; \; S_3 = kP_3r_3; \; S_4 = kP_4r_4;$ wherein k is signal conversion factor.

The junction O will take the equilibrium position under the action of these forces.

Due to the geometrical similarity of the actual contour I and the master contour II (FIGS.1, 2) a figure defined by the segments of the pull elements $r_1, r_2, r_3, r_4$ inside the master contour II will have the corresponding figure inside the actual contour I which is formed by segments $R_1 = \alpha r_1; \; R_2 = \alpha r_2; \; R_3 = \alpha r_3; \; R_4 = \alpha r_4$, wherein $\alpha$ is scale factor.

A point $O_o$ will correspond to the center of the junction O of the pull elements inside the master contour II.

Figure 3:
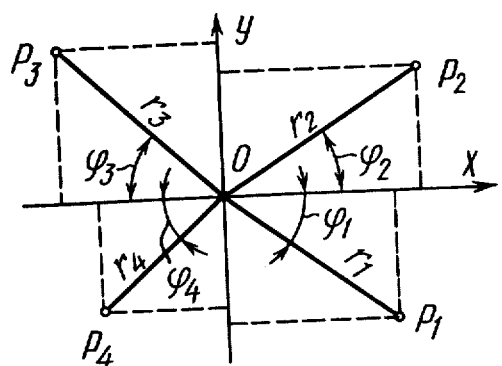
FIG. 3 is a calculation diagram for determining the position of the resultant force of support reactions of the object.

Referring now to the operation of the arrangement according to the invention, it will be shown that the point $O_o$ inside the actual support contour I simulated by the equilibrium position of the pull elements junction O inside the master contour II is the point of application of the resultant force Q (FIG. 1) of the support reactions $P_1, P_2, P_3, P_4$ of the self-supported object. FIG. 3 shows the points $P_1, P_2, P_3, P_4$ of application of identically designated parallel forces normal to the drawing and having one and the same direction. It is assumed that the resultant force of these forces is applied at the origin. Therefore, a total moment of all these forces about the coordinate axes x and y is equal to O, that is:

$$\sum_{i=1}^{n} P_i \, z_i \, \cos \varphi_i = 0; \; \sum_{i=1}^{n} P_i \, z_i \, \sin \varphi_i = 0 \; (i = 1,2,3,4) \quad (1)$$

Figure 4:
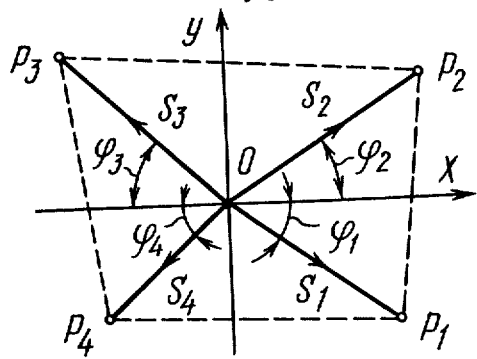
FIG. 4 is a calculation diagram for the pull elements equilibrium conditions.

By multiplying these equations by the conversion factor k and by substituting $$kP_i r_i = S_i \quad (2)$$

the following equations can be derived:

$$\sum_{i=1}^{n} S_i \cos \varphi_i = 0; \; \sum_{i=1}^{n} S_i \sin \varphi_i = 0 \quad (3)$$

which express the conditions of the equilibrium of the pull elements (FIG. 4) interconnected in a single common junction at the origin and extending through the points of application of forces P, with the values of tension in the pull elements being expressed by equation (2). Since the equations (3) may be multiplied by any common scale factor, the situation will not change for any scale of the figure formed by the pull elements so that the principle of the arrangement according to the invention will persist.

The situation will not change in the case, where all signs are changed for their opposite in the equations (3). Therefore, the arrangement can operate both with pull or push elements.

In the case where the master center O (FIG. 2) is at the boundary of the master contour II, the object will be in an unstable state where it is supported on one of the tilting lines only.

Since such a critical situation is considered unacceptable for operation of the crane, a protective contour III is provided inside the master contour II so that upon the contact of the junction O with this contour III an appropriate protective device is actuated in such a manner that the energization of the protective device takes place before the critical position of the crane reached and with a certain stability margin.

The arrangement according to the invention is inserted in the control circuit by known methods.

The operation of the transducer is described with reference to FIGS. 6 and 7. Fluid pressure from the sensor — hydraulic cylinder 22 — of the support $A_o$ transmits, via the piston couple 23, a tension to the pull element 24 which is proportional to the value of the support reaction $P_1$. As a result of the deviation of the midpoint G of the pull element 24 by the amount $\bar{r}_1$, a tension $S_1$ appears in the pull element 25 which is transmitted, via the displacement amplifier 26, to the pull element 1 of the master contour II in the form of the tension $$S_1 = 4\bar{P}_1 \, r_1/l \, (d_1/d_2)^2,$$

which is proportional to the value of the support reaction multiplied by the length $r_1$ of the pull element inside the master contour.

The arrangement shown in FIG. 8 for checking stability of a crane shown functions as follows. Signals $\bar{P}_A, \bar{P}_B, \bar{P}_C, \bar{P}_D$, which are proportional to the support reactions, are fed to the transducers $A_1, B_1, C_1, D_1$ and are multiplied by the length of corresponding pull elements $a_x x_o, b_x x_o, c_x x_o, d_x x_o$. The resulting forces $S_A, S_B, S_C, S_D$ are transmitted to the pull elements so that the junction $x_o$ takes the position corresponding to the position of the resultant force of the support reactions on the axis $D_x$ which can be readily shown. Indeed, $$S_A + S_B - S_C - S_D = 0 \text{ or} \quad (4)$$

$$\bar{P}_A' x_o a_x + \bar{P}_B x_o b_x - \bar{P}_C x_o c_x - \bar{P}_D x_o d_x = 0 \quad (5)$$

and since $\bar{P}_A = P_A/n; \; \bar{P}_B = P_B/n; \; \bar{P}_C = P_c/n; \; \bar{P}_d = P_d/n$ and $x_o a_x = x_o A/m; \; x_o b_x = x_o B/m; \; x_o c_x = x_o C/m; \; x_o d_x = x_o D/m;$ wherein n is proportionality factor; and m is scale factor. By substituting these values in equation (5) the condition defining the position of the center of resultant force of the support reactions $P_A, P_B, P_C, P_D$ is obtained:

$$P_a/n \cdot X_oA/m + P_b/n \cdot X_oB/m - P_c/n \cdot X_oC/m - P_d/n \cdot X_oD/m = 0$$

or $$P_A \cdot X_oA + P_B X_oB - P_C X_oC - P_D \cdot X_oD = 0.$$

The equation defining the position of the point inside the master contour is identical to that defining the position of the center of gravity inside the support contour of the object, so that the positions of the both points are identical.

The arrangement for checking stability shown in FIGS. 11, 12 functions as follows.

Fluid pressure corresponding to the value of the support reaction is fed from the crane support sensors to each of the piston couples 29. The force appearing in each piston couple 29 is transmitted to the sector 34. Under the action of these forces the sector 34 takes a certain equilibrium position, while rotating the gear 36. The displacement of the sector 34 amplified by the pulley system is transmitted to the pointer on the scale 41, which takes the position corresponding to the position of the toothed sector 34. The equilibrium position of the sector 34 is determined by the equality of the moments created by the forces acting in the rods 30 about the point $O_2$ of the suspension of the sector 34 (FIG. 10), that is:

$$P_a \cdot r_a^x + P_B \cdot r_b^x - P_c \cdot r_c - P_d \cdot r_d^x = 0 \qquad (6)$$

The dimensions of the arrangement are selected such that the arms $r_a^x, r_b^x, r_c^x, r_d^x$ are proportional to the arms $R_A^x, R_{Bx}, R_C^x, R_D^x$ of the actual support contour I (FIG. 9) which represent the distances from each support to the resultant force of the support reactions of the crane, so that $$r_a^x/z_a^x = R_b^x/z_b^x = R_c^x/z_c^x = R_d^x/z_d^x = m.$$

The forces $p_a, p_b, p_c, p_d$ are proportional to the support reactions, so that $$P_A/P_a = P_B/P_b = P_C/P_c = P_D/P_d = n,$$

and the equation (6) is then readily transformed into the equation $$R_A^x P_A + R_B^x P_b - P_C R_c^x - P_D R_D = 0,$$

which is the bais condition for determination of the position of the resultant force of the support reactions.

It should be noted that the displacement of the point 0 (FIG. 10) along the sector arc will correspond to the displacement of the point O (FIG. 10) along the sector arc will correspond to the displacement of the point $O_x$ of the resultant force of the support reactions, if the length of the sector arc aoc is approximately equal to the length of the projection $A_xO_xC_x$. This condition is fulfilled with a sufficent accuracy at small angles $\alpha$ (FIG. 10), whereby $2S_2 \sin \alpha/2 \approx S_2\alpha$. With $\alpha \leq 10°$ the error is of 0.1%.

The embodiment of the arrangement shown in FIG. 13 operates as follows.

Objects placed on the platform 43 (FIG. 13) transmit to each of the support holders 48,49,50,51 of the platform 43 a predetermined force. Each of said holders transmits this force to the transducer (FIG. 14). A force equal to the force in the holder multiplied by the length of the pull element inside the master contour is transmitted to each pull element of the master contour.

The arrangement shown in FIGS. 15, 16 functions as follows. Objects placed on the platform 61 transmit a certain force to each of the supports 62 of the platform 61. Each support 62 transmits this force to the transducer which is tensioned in correspondence with the force transmitted thereto.

All four transducers will transmit to the pull elements 65 a displacement so that the junction O of the pull elements will be displaced to take the position which corresponds, in a certain scale, to the position of the center of gravity of the objects placed on the platform.

The needle 72 connected to the junction O will be displaced with a motion which can be represented as linear motion pluse rotation about a vertical axis. The linear motion of the junction O is converted into the displacement of the piston rod 71 by the pistons 70 in the cylinder of the piston couple 69, while the rotation of the junction O is converted into the rotation of the holder 68 by the piston couple 69 and, accordingly, of the pointer tube 74 about a vertical axis. The dimensions of all the elements of the arrangement are selected such that the rotation of the pointer tube 74 and the displacement of the extraneous liquid 75 therein will result in that the extraneous point-like liquid inclusion 75 will take a position in the tube 74 which will accurately correspond to the position of the center of gravity of the objects placed on the platform 61.

What is claimed is:

1. An arrangement for checking stability of a self-supported object having sensors of the values of normal support reactions of the object, comprising, in combination: guide members mounted at the vertexes of a master contour which is geometrically similar to a support contour of the object formed by the lines interconnecting its support points; pull elements extending through said guide members, one end of each pull element being connected to the corresponding ends of the other pull elements inside the master contour so as to form a freely displaceable junction; transducers, each being connected to one of said sensors and to the other end of the respective pull element, whereby a moment, which is directly proportional to the value of the respective support reaction and to the length of said pull element, is transmitted to said pull element, and the junction interconnecting said pull elements takes the position inside said master contour which coincides with the position of the point of application of the resultant force of the normal support reactions of the object.

2. An arrangement as claimed in claim 1, wherein the guide members comprise pulleys loosely mounted on axles, and the pull elements comprise flexible threads reeved in said pulleys.

3. An arrangement as claimed in claim 1, wherein each of said transducers comprises two pivotally interconnected pull elements having the other ends thereof pivotally secured at fixed points, and at least one of the pull elements is connected to a support sensor which transmits a force to this pull element, while the junction interconnecting the pull elements is connected to the pull element of the master contour which deviates the pull element of the transducer in the transverse direction with respect to the initial straight position of the pull elements by the amount proportional to the length of the pull element inside the master contour, whereby a force, which is proportional to the support reaction multiplied by the length of the pull element inside the master contour, is transmitted to the pull element of the master contour.

4. An arrangement as claimed in claim 1, wherein the guide members are mounted at the points of the projections of the vertexes of the support contour of the object on one of the selected coordinate axes, whereby the junction interconnecting the pull elements takes the position coinciding with the position of the point of the projection of the resultant force of the support reactions of the object on the selected coordinate axis.

5. An arrangement as claimed in claim 1, wherein the pull elements each comprise a sector having a large radius of curvature, which sector is loosely mounted on an axle, and the transducers comprise rods of a length variable under the action of a force proportional to the support reaction, said rods being pivotally connected to a common axis at one end, the other ends of the rods being pivotally connected to the points of the sector arc corresponding to the positions of the projections of the vertexes of the support contour of the object on the selected coordinate axis, whereby the point of the sector arc corresponding to the position of the projection of the resultant force of the support reactions on the same coordinate axis is displaced, under the action of forces in the rods, by the same amount as the projection of the resultant force.

6. An arrangement as claimed in claim 1, wherein there is provided a platform for placing objects thereon, and the master control is geometrically similar to the support contour of the platform.

7. An arrangement as claimed in claim 6, wherein in order to eliminate the influence of the weight of the platform on the readings of the arrangement, the platform is connected with its support points to means for counterbalancing the weight of the platform.

8. An arrangement as claimed in claim 6, wherein the master contour is located under the platform, and the dimensions of the master contour are identical to those of the support contour of the platform, the latter being made of a transparent material and graduated in units defining the coordinates of the center of gravity of an object in preselected coordinate axes.

9. An arrangement as claimed in claim 6, wherein there is provided an indicating instrument arranged under the transparent platform and comprising two piston couples interconnected by means of a piston rod and connected to the junction interconnecting the pull elements of the master contour, while the chambers of the cylinders of the piston couples are interconnected by a transparent pointer tube filled with liquid having an extraneous point-like liquid inclusion of a colour different from that of said liquid, the piston couples being fixed, together with the transparent pointer tube, in a holder rotatable about a vertical axis, the dimensions of all the elements of the indicating instrument being selected such that the position of the extraneous point-like liquid inclusion in the pointer tube corresponds, in a certain scale, to the position of the junction of the pull elements inside the master contour.

* * * * *